(12) United States Patent
Kuo et al.

(10) Patent No.: US 6,711,889 B2
(45) Date of Patent: Mar. 30, 2004

(54) GAS TURBINE ENGINE

(75) Inventors: Chii-Rong Kuo, Taoyuan Hsien (TW); Ta-Wei Wang, Panchiao (TW); Jia-Ruey Wu, Hsinchu Hsien (TW); Hsin-Yi Shih, Taoyuan Hsien (TW); Tao-Pang Hsiung, Pingtung (TW); Chia-Yang Chang, Tu-Cheng (TW)

(73) Assignee: Industrial Technology Research Institute (TW)

( * ) Notice: Subject to any disclaimer, the term of this patent is extended or adjusted under 35 U.S.C. 154(b) by 20 days.

(21) Appl. No.: 10/183,595

(22) Filed: Jun. 28, 2002

(65) Prior Publication Data

US 2004/0000148 A1 Jan. 1, 2004

(51) Int. Cl.$^7$ ................................................ F02C 7/10
(52) U.S. Cl. ............ 60/39.511; 165/164; 165/DIG. 398
(58) Field of Search ....................... 60/39.511; 165/164, 165/DIG. 398

(56) References Cited

U.S. PATENT DOCUMENTS

| | | | | |
|---|---|---|---|---|
| 1,702,264 A | * | 2/1929 | Lorenzen | 60/39.511 |
| 2,895,296 A | * | 7/1959 | Hryniszak | 60/39.511 |
| 2,925,714 A | * | 2/1960 | Cook | 60/39.511 |
| 3,507,115 A | * | 4/1970 | Wisoka | 60/39.511 |
| 4,506,502 A | * | 3/1985 | Shapiro | 60/39.511 |
| 5,685,156 A | * | 11/1997 | Willis et al. | 60/39.511 |
| 5,855,112 A | * | 1/1999 | Bannai et al. | 60/39.511 |

FOREIGN PATENT DOCUMENTS

GB        164294    * 5/1921

\* cited by examiner

*Primary Examiner*—Michael Koczo
(74) *Attorney, Agent, or Firm*—Bacon & Thomas, PLLC

(57) ABSTRACT

A recuperated gas turbine engine. The gas turbine engine includes a heat exchanger, and gas turbine (including compressor, can-type combustor and turbine). The heat exchanger includes a compressed air passageway and a turbine exhaust gas passageway adjacent to each other within the casing which extend spirally throughout the heat exchanger and towards an inner cylindrical chamber in which the combustor is positioned approximately to the center of the casing. Improved engine fuel efficiency is achieved by preheating the compressed air before it reaches the combustor with the higher-temperature exhaust gas. A can-type combustor is used for alleviating heat-dissipation issues to improve efficiency of the combustion. A concentric back-to-back rotor arrangement significantly shortens the length of a conventional engine turbine rotor which improves on the operational stability of a gas turbine engine.

6 Claims, 3 Drawing Sheets

GAS TURBINE ENGINE

BACKGROUND OF THE INVENTION

1. Field of the Invention

The present invention relates to gas turbine engines and, more particularly, to a gas turbine engine capable of having compact dimensions, light weight, and improved fuel efficiency as well as providing operational stability.

2. Description of Related Art

Currently, a typical conventional gas turbine engine 9 generally comprises a compressor section 91, a combustor section 92, and a turbine section 93, wherein an engine core turbine rotor 95 having a shaft 950 is positioned inside a casing 94, as shown in FIG. 1. An annular space is thereby formed between the shaft 950 and the casing 94 which substantially encloses a conventional annular combustor 96 within.

Referring to FIG. 1, air is compressed after passing through compressor stator blades 941 and compressor rotor blades 981 to become highly pressurized gas due to centrifugal force and diffusion effect. Compressed air then enters the annular combustor 96 to be mixed with fuel for combustion which produces highly pressurized gas stream that is also high in temperature; the gas stream is then forced out through a plurality of engine core turbine rotor blades 951 which drive the shaft 950 and the compressor rotor blades 981 into rotation. Subsequently, the gas stream passes through a plurality of turbine rotor blades 971 which drives a turbine rotor 97 into rotation to produce shaft power.

Nevertheless, an extra annular space is required inside the casing 94 to accommodate the annular combustor 96 of the aforementioned conventional gas turbine engine 9 which not only makes compact engine designs difficult but also causes heat in the combustor to dissipate without performing any mechanical work.

After air is compressed as it enters the compressor section 91, it is fed directly into the annular combustor 96 to be combusted with fuel without any preheating. Due to the lack of preheating the air prior to combustion, extra fuel is needed inside the annular combustor 96, which decreases fuel efficiency of the conventional gas turbine engine 9.

Furthermore, as shown in FIG. 1, the compressor rotor blades are formed on a compressor rotor 98 positioned in the front of the gas turbine engine 9 while the engine core turbine rotor 95 and the turbine rotor 97 are positioned in the rear. Any uneven vibration transmitted through the axis of the shaft 950 can cause unstable engine operation; especially when high operating temperature within the turbine section 93 tends to shorten the operation life of different mechanical parts such as a bearing.

Therefore, it is desirable to provide an improved gas turbine engine capable of having improved operational stability while at the same time having the advantages of compact design, light weight, and enhanced fuel efficiency to mitigate and/or obviate the aforementioned problems.

SUMMARY OF THE INVENTION

A primary object of the present invention is to provide a gas turbine engine which employs a recuperator to improve on fuel consumption by using the recuperator as an energy-saving heat exchanger.

Another object of the present invention is to provide a gas turbine engine wherein a compressor rotor is concentrically positioned back-to-back with a turbine rotor on a single shaft to increase operational stability of the rotors.

Still another object of the present invention is to provide a gas turbine engine wherein a can-type combustor is used for alleviating heat-dissipation issues to improve efficiency of the combustion.

The present invention achieves the above-mentioned objects by providing a gas turbine engine comprising: a casing, a recuperator functioning as a heat exchanger, a combustor, and a turbine engine rotor comprising a coaxial compressor rotor and a turbine rotor; wherein, the casing has an approximately cylindrical shape having a circular shoulder portion which extrudes outwardly and forms a casing opening to a first end and a bottom plate sealing a second end of the casing on the opposite side. The recuperator functions as a heat exchanger and includes two spaced-apart divider walls which extend spirally inwards from an inner perimeter of the casing towards an inner chamber inside the casing. A combustor is installable within the chamber having a main exhaust opening formed towards the first opening and a plurality of air holes. Since the entire design of the combustor is approximately a can-type shape, the spatial requirement associated with the engine thus can be significantly reduced, and eliminates the heat-dissipation issues, greatly increases fuel efficiency during engine operation.

The heat exchanger further comprises a top plate spacing a gap with the shoulder portion of the casing, the two spaced-apart divider walls sealing both ends with the top plate and the bottom plate and forming spirally a compressed air passageway and a turbine exhaust gas passageway adjacent to each other throughout the heat exchanger. The compressed air passageway of the heat exchanger connects the inner chamber with the gap, and the turbine exhaust gas passageway connects the main exhaust opening of the combustor with an exhaust vent formed on the bottom plate. Because the compressed air passageway and the turbine exhaust gas passageway are spirally formed adjacent to each other, air coming through the compressed air passageway is preheated along the way by the exhaust gas vented through the turbine exhaust gas passageway. Thus, the improved fuel efficiency of a gas turbine engine according to the present invention is achieved simply by combusting less fuel with higher-temperature compressed air.

Another aforementioned object of the present invention is to improve on the operational stability of a gas turbine engine by having the compressor rotor and the turbine rotor formed back-to-back on a single shaft concentrically; wherein, compressor rotor blades are perimetrically formed onto the compressor rotor directly behind the main exhaust opening. Thus, the operational stability of the gas turbine engine according to the present invention is improved by having a significantly shorter shaft than that of a conventional gas turbine engine. Another advantage of having a back-to-back rotor arrangement is that the operation life of the shaft bearing is prolonged because it is positioned farther away from the combustor than that of a conventional gas turbine engine.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
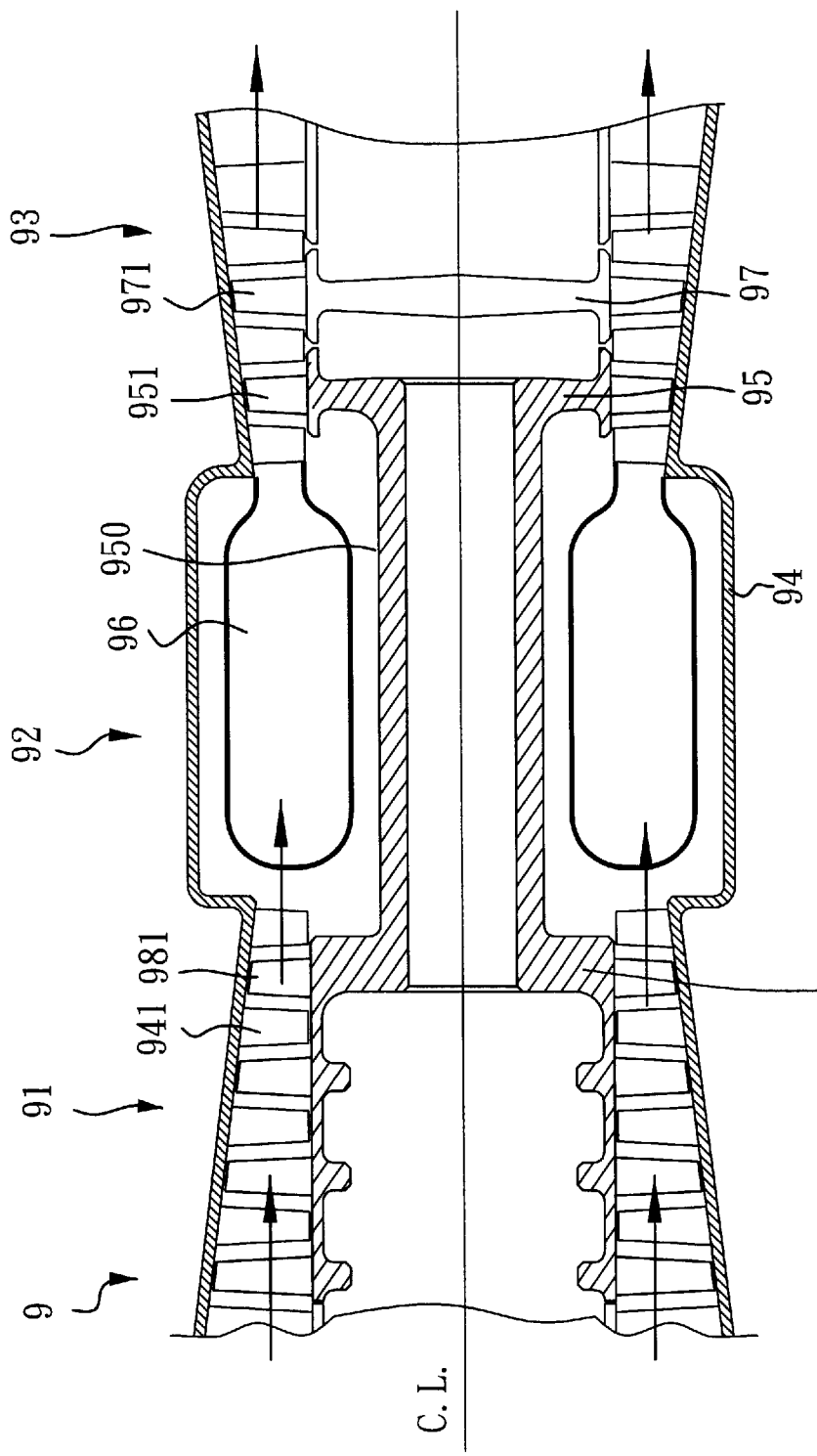
FIG. 1 is a schematic diagram of a conventional gas turbine engine represented through a sectional view.
Figure 2:
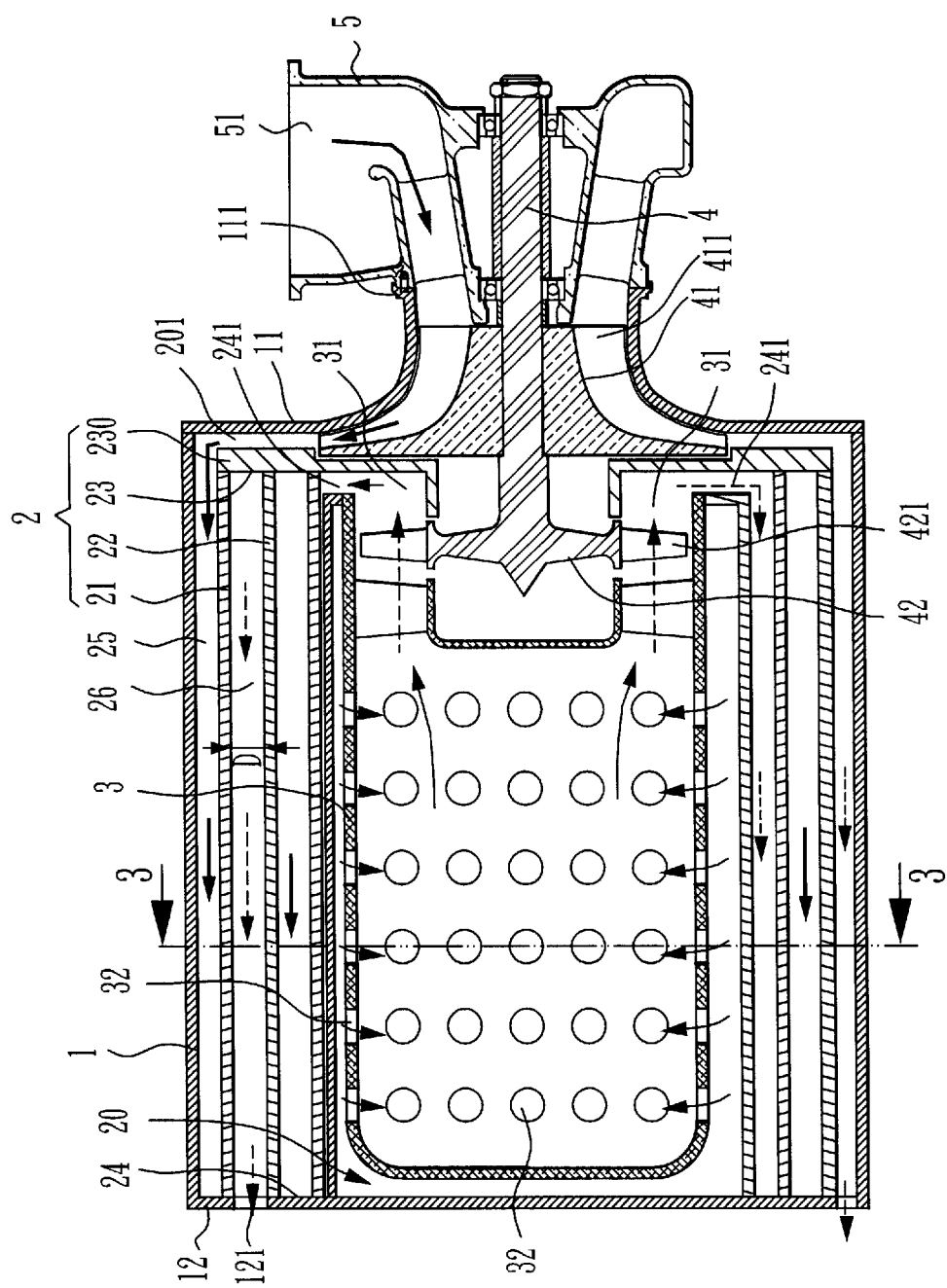
FIG. 2 is a side sectional view of a gas turbine engine according to the present invention.
Figure 3:
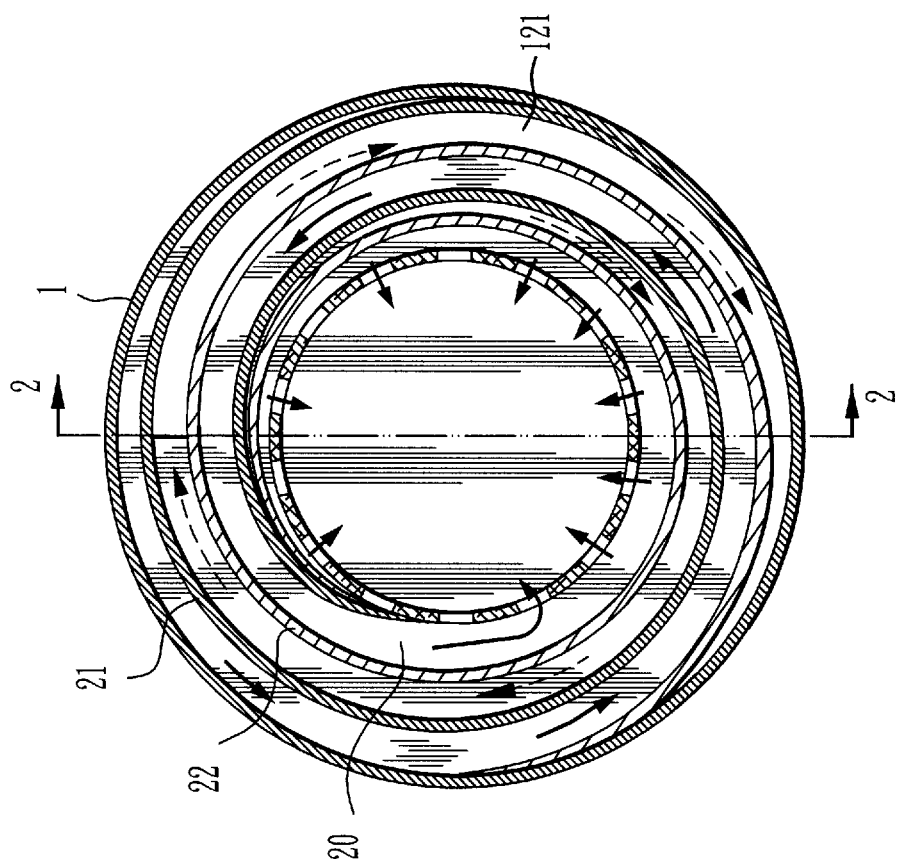
FIG. 3 is a frontal sectional view A-A of the gas turbine engine shown in FIG. 2.

With reference to FIGS. 2 and 3, there is shown a schematic micro gas turbine engine as an example to help illustrate the present invention. The gas turbine engine is cylindrical-shaped comprising a casing 1 having a circular shoulder portion 11 which extrudes outwardly and forms a casing opening 111 to a first end and a bottom plate 12 sealing a second end of the casing 1 on the opposite side. An air intake unit 5 having an intake opening 51 is connected to the casing opening 111 to allow more air to enter freely.

The present invention is characterized by further comprising a recuperator 2 functioning as a heat exchanger having internally formed a first divider wall 21 and a spaced-apart second divider wall 22, which extend spirally from the outer perimeter of the casing 1 towards a cylindrical inner chamber 20 formed approximately to the center of the casing 1. As shown in FIG. 2, a capital letter "D" is labeled to illustrate the distance between the spaced-apart divider walls 21, 22. A combustor 3, preferably a can-type combustor for spatial and heat dissipation reasons, is formed within the inner chamber 20. The combustor 3 further comprises a main exhaust opening 31 formed towards the first end and a sidewall formed with a plurality of air holes 32 therethrough.

The recuperator 2 comprises a first rim 23 towards the first end, a second rim 24 towards the second end, and a top plate 230 formed adjacent to the first rim 23; wherein, the top plate 230 is positioned approximately perpendicular to the spiral divider walls 21, 22. The second rim 24 of the recuperator 2 is sealed by the bottom plate 12 of the casing 1. Thereby, the spaced-apart divider walls 21, 22 form spirally a compressed air passageway 25 and a turbine exhaust gas passageway 26 adjacent to each other. The rim 24 of the present invention according to this embodiment is sealed by the bottom plate 12 of the casing 1 preferably by, but not limited to the use of a continuous welding technique.

A gap is formed between the top plate 230 of the recuperator 2 and the shoulder portion 11 of the casing 1. The compressed air passageway 25 connects the inner chamber 20 with the gap 201. The turbine exhaust gas passageway 26 connects to the main exhaust opening 31 of the combustor 3 with an exhaust vent 121. The shape of the exhaust vent is substantially semi-annular according to an embodiment of the present invention.

As shown in FIG. 2, the gas turbine engine of the present invention further comprises a turbine engine rotor 4 comprising a coaxial compressor rotor 41 and a turbine rotor 42, compressor rotor blades 411 perimetrically formed on the compressor rotor 41, and a plurality of turbine rotor blades 421 perimetrically formed on the turbine rotor 42; wherein, the compressor rotor blades 411 are positioned towards the casing opening 111, and the turbine rotor blades 421 are positioned towards the main exhaust opening 31.

A cold compressed air is initially accumulated after the compressor rotor blades 411 draws open air into the intake opening 51 by centrifugal force and diffusion effect, and then into the compressed air passageway 25 through the gap 201 spacing by the top plate 230 with the shoulder portion 11 of the casing 1. Because the compressed air passageway 25 and the turbine exhaust gas passageway 26 are spirally formed adjacent to each other, cold compressed air passing through the compressed air passageway 25 is continuously preheated along the way by the exhaust gas vented through the turbine exhaust gas passageway 26 before it reaches the combustor 3. Thus, the improved fuel efficiency of a gas turbine engine according to the present invention is achieved simply by combusting less fuel in the combustor 3 with higher-temperature compressed air, and in addition, the combustor loading is reduced and stability is improved by increasing the temperature of the compressed air.

After compressed intake air is combusted with fuel inside the combustor 3, high-pressure and high-temperature gas stream is rapidly forced out of the combustor 3 through the main exhaust opening 31 and directly onto the plural turbine rotor blades 421, which drives the turbine rotor 42 into rotation to produce shaft power. Exhaust gas is then expelled through the exhaust vent 121.

Thus, the operational stability of the gas turbine engine according to the present invention is improved by having a significantly shorter turbine engine rotor 4 than that of a conventional gas turbine engine. Another advantage of having a back-to-back rotor arrangement is that the operation life of rotor bearing (not numerated) is prolonged because it is positioned farther away from the combustor 3 than that of a conventional gas turbine engine.

Although the present invention has been explained in relation to its preferred embodiment, it is to be understood that many other possible modifications and variations can be made without departing from the spirit and scope of the invention as hereinafter claimed.

What is claimed is:

1. A gas turbine engine, comprising:
    a cylindrical-shaped casing comprising a circular shoulder portion that includes a casing opening at a first end thereof, and a bottom plate sealing a second end of said casing on an opposite side thereof;
    a heat exchanger comprising two spaced-apart divider walls which extend spirally inwards from an inner perimeter of said casing towards an inner chamber inside said casing, and a top plate spacing a gap with the shoulder portion of said casing, said two spaced-apart divider walls sealing both ends with the top plate and the bottom plate and forming spirally a compressed air passageway and a turbine exhaust gas passageway adjacent to each other throughout the heat exchanger;
    a combustor installed in the inner chamber of said casing comprising a main exhaust opening formed towards the first end, and a sidewall formed with a plurality of air holes therethrough; and
    a turbine engine rotor comprising a coaxial compressor rotor and a turbine rotor, each of the rotors having a plurality of blades, wherein the blades of compressor rotor are positioned facing said casing opening, and the blades of turbine rotor are positioned facing said main exhaust opening.

2. The gas turbine engine as claimed in claim 1, wherein the compressed air passageway of the heat exchanger connects said inner chamber with said gap; said turbine exhaust gas passageway connects the main exhaust opening of said combustor with an exhaust vent formed on the bottom plate.

3. The gas turbine engine as claimed in claim 2, wherein the exhaust vent is of substantially semi-annular shape.

4. The gas turbine engine as claimed in claim 1, wherein the combustor is a can-type combustor.

5. The gas turbine engine as claimed in claim 1, further comprising an air intake unit having an intake opening adapted for drawing open air into the casing opening.

6. The gas turbine engine as claimed in claim 1, wherein the heat exchanger is a type recuperator.

* * * * *